United States Patent
Hubenthal et al.

(10) Patent No.: US 8,704,867 B2
(45) Date of Patent: Apr. 22, 2014

(54) METHOD AND SYSTEM FOR OPTIMAL BALANCE AND SPATIAL CONSISTENCY

(75) Inventors: Michael B. Hubenthal, San Jose, CA (US); Vijayaraghavan R. Triplicane, Union City, CA (US); Brian J. Baldino, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/525,751

(22) Filed: Jun. 18, 2012

(65) Prior Publication Data

US 2012/0314060 A1  Dec. 13, 2012

Related U.S. Application Data

(63) Continuation of application No. 11/799,090, filed on Apr. 30, 2007, now Pat. No. 8,203,591.

(51) Int. Cl.
 *H04N 7/14* (2006.01)
(52) U.S. Cl.
 USPC ............... 348/14.07; 348/14.08; 348/14.11; 370/260; 370/270; 709/201; 709/220
(58) Field of Classification Search
 USPC ............. 348/14.01–14.16, 14.01–14.06; 370/259–271, 351–357; 709/201–207, 709/217–248; 455/3.01–3.06, 403–426.2, 455/456.1–466, 550.1–560, 575.1–575.9, 455/90.1–90.3
See application file for complete search history.

(56) References Cited

U.S. PATENT DOCUMENTS

| | | | |
|---|---|---|---|
| 4,400,724 A | 8/1983 | Fields | 358/85 |
| 5,737,011 A | 4/1998 | Lukacs | 348/15 |
| 6,049,694 A * | 4/2000 | Kassatly | 725/144 |
| 6,172,703 B1 | 1/2001 | Lee | 348/15 |
| 6,266,082 B1 * | 7/2001 | Yonezawa et al. | 348/159 |
| 6,288,740 B1 * | 9/2001 | Lai et al. | 348/14.09 |
| 6,356,294 B1 * | 3/2002 | Martin et al. | 348/14.07 |
| 6,710,797 B1 | 3/2004 | McNelley et al. | 348/14.16 |
| 6,774,927 B1 | 8/2004 | Cohen et al. | 348/14.1 |
| 6,795,108 B2 | 9/2004 | Jarboe et al. | 348/14.09 |
| 6,882,358 B1 | 4/2005 | Schuster et al. | 348/14.16 |
| 6,922,718 B2 * | 7/2005 | Chang | 709/204 |
| 6,989,836 B2 | 1/2006 | Ramsey | 345/522 |

(Continued)

OTHER PUBLICATIONS

Weinstein, et al., Emerging Technologies for Teleconferencing and Telepresence, *Wainhouse Research*, 54 pages, 2005.

(Continued)

*Primary Examiner* — Hemant Patel
(74) *Attorney, Agent, or Firm* — Baker Botts L.L.P.

(57) ABSTRACT

A method for assigning video signals includes receiving a plurality of video signals from a plurality of cameras located at one or more remote sites, the plurality of video signals for display on a plurality of monitors at a local site. The method includes determining an optimal monitor for displaying a first video signal associated with a first camera based on the location and alignment of the first camera in relation to one or more of the plurality of cameras. The method includes calculating a respective difference between a number of video signals assigned to the optimal monitor and a respective number of video signals assigned to each respective monitor of the plurality of monitors. The method further includes assigning the first video signal to the optimal monitor if the respective difference is not greater than a threshold value with respect to each of the plurality of monitors.

16 Claims, 2 Drawing Sheets

(56) References Cited

U.S. PATENT DOCUMENTS

| | | | |
|---|---|---|---|
| 7,043,528 | B2 | 5/2006 | Schmitt et al. ............... 709/204 |
| 7,057,636 | B1 | 6/2006 | Cohen-Solal et al. ..... 348/14.08 |
| 7,111,045 | B2 | 9/2006 | Kato et al. .................... 709/205 |
| 7,515,174 | B1* | 4/2009 | Francisco et al. ......... 348/14.16 |
| 7,679,639 | B2 | 3/2010 | Harrell et al. ............. 348/14.08 |
| 7,707,247 | B2 | 4/2010 | Dunn et al. ................... 709/204 |
| 2003/0149724 | A1 | 8/2003 | Chang .......................... 709/204 |
| 2005/0024484 | A1 | 2/2005 | Leonard et al. .............. 348/14.1 |
| 2005/0036067 | A1* | 2/2005 | Ryal et al. ...................... 348/565 |
| 2005/0248652 | A1 | 11/2005 | Firestone et al. .......... 348/14.09 |
| 2005/0264648 | A1* | 12/2005 | Ivashin et al. ............. 348/14.09 |
| 2006/0066717 | A1 | 3/2006 | Miceli ....................... 348/14.09 |
| 2006/0152575 | A1 | 7/2006 | Amiel et al. ............... 348/14.01 |
| 2006/0158509 | A1 | 7/2006 | Kenoyer et al. ........... 348/14.08 |
| 2006/0168302 | A1 | 7/2006 | Boskovic et al. ............. 709/231 |
| 2006/0244817 | A1* | 11/2006 | Harville et al. ............ 348/14.08 |
| 2007/0040900 | A1* | 2/2007 | Castles ...................... 348/14.08 |
| 2007/0206091 | A1 | 9/2007 | Dunn et al. ................ 348/14.08 |
| 2007/0294346 | A1* | 12/2007 | Moore et al. .................. 709/204 |
| 2008/0068446 | A1 | 3/2008 | Barkley et al. |

OTHER PUBLICATIONS

Lambert, *Polycom Video Communications*, © 2004 Polycom, Inc., 4 pages, Jun. 20, 2004.

Alan Stillerman, "A Look inside H.239," www.ihets.org, Sep. 2004, 3 pages.

Andrew Davis, "Video Communications Industry Backgrounder," *Wainhouse Research*, www.TANDBERG.net, Aug. 15, 2006, 4 pages.

Dunn, et al., *System and Method for Displaying Participants in a Videoconference between Locations*, patent application with drawings; U.S. Appl. No. 11/366,861, filed Mar. 2, 2006; (34 pages).

Dunn, et al., *System and Method for Displaying Users in a Visual Conference between Locations*, patent application with drawings;U.S. Appl. No. 11/483,864, filed Jul. 10, 2006; (27 pages).

Graham, et al., *System and Method for Displaying a Videoconference*; patent application with drawings; U.S. Appl. No. 11/567,674; (41 pages), Dec. 6, 2006.

* cited by examiner

METHOD AND SYSTEM FOR OPTIMAL BALANCE AND SPATIAL CONSISTENCY

RELATED APPLICATIONS

This application is a continuation of U.S. application Ser. No. 11/799,090, filed Apr. 30, 2007 by Michael B. Hubenthal and entitled "Method and System for Optimal Balance and Spatial Consistence".

TECHNICAL FIELD

This invention relates generally to the field of telecommunications and more specifically to a method and system for optimal balance and spatial consistency.

BACKGROUND

There are many methods available for groups of individuals to engage in conferencing. One common method, videoconferencing, involves one or more individuals located in one location engaging in a videoconference with one or more individuals located in at least one other location, remote from the first. Videoconferencing involves the use of video equipment, such as cameras, microphones, displays and speakers. When the remote location has more cameras than the local location has displays, individuals at the local location have an artificial and unrealistic experience during the videoconference. Similarly, individuals at the local location may have a diminished experience if the aggregate number of cameras at several remote locations outnumbers the displays at the local location due to continuous switching among the signals from the cameras.

To address such problems, certain systems employ metrics to determine how or where a video image is displayed. For example, some videoconference systems will only present one video signal at a time on a monitor. In these videoconference systems the video signal that is presented within the display is usually determined by voice activity (e.g., the last person to talk is the one that is presented). Some systems may support as many displays as there are remote sites participating in the videoconference. As the number of remote sites participating in the videoconference increase so does the number of displays. Other videoconference systems may divide the monitor into a plurality of displays where each display is associated with a particular remote site (these types of videoconference systems are sometimes referred to as Hollywood Squares or Continuous Presence). While such systems may allow for the participants at a local site to constantly view each remote participant, user experience may be diminished because such systems may not maintain spatial consistency. Additionally, these systems may necessitate reducing the size of each image in the conference to accommodate each remote site and/or participant that joins the conference.

SUMMARY OF THE DISCLOSURE

The present invention provides a method and system for assigning video signals that substantially eliminates or greatly reduces at least some of the disadvantages and problems associated with previous methods and systems.

In accordance with a particular embodiment, a method for assigning video signals includes receiving a plurality of video signals from a plurality of cameras located at one or more remote sites, the plurality of video signals for display on a plurality of monitors at a local site. The method also includes determining an optimal monitor for displaying a first video signal associated with a first camera based on the location and alignment of the first camera in relation to one or more other cameras of the plurality of cameras. In addition, the method includes calculating a respective difference between a number of video signals assigned to the optimal monitor and a respective number of video signals assigned to each respective monitor of the plurality of monitors. The method further includes assigning the first video signal to the optimal monitor if the respective difference is not greater than a threshold value.

In a more particular embodiment, the method also includes determining that a particular monitor has more than one video signal assigned thereto. In response to determining that a particular monitor has more than one assigned signal, the method includes selecting a video signal for display. In a certain embodiment, the video signal for display is selected based on the audio level of each of the video signals assigned to the monitor.

A further embodiment provides a system for assigning video signals that includes, an interface, a plurality of monitors, and a processor coupled to the interface. The interface is operable to receive a plurality of video signals from a plurality of cameras located at one or more remote sites. The plurality of monitors are operable to display one or more of the video signals. The processor may be operable to determine an optimal monitor for displaying a first video signal associated with a first camera based on the location and alignment of the first camera in relation to at least one other camera of the plurality of cameras. The processor is also operable to calculate a respective difference between the number of video signals assigned to the optimal monitor and the number of video signals assigned to each other monitor. The processor may also assign the first video signal to the optimal monitor if the difference is not greater than a threshold amount with respect to any of the plurality of monitors.

In some embodiments the threshold value may represent a flexibility rating which indicates the relative degree to which a video signal may be assigned to a monitor other than the optimal monitor. In particular, the threshold value may be based on the location and alignment of a camera relative to another camera.

Certain embodiments of the invention may provide one or more technical advantages. A technical advantage of a particular embodiment includes balancing the number of signals assigned to a particular monitor while maintaining spatial consistency. Maintaining spatial consistency may provide a realistic experience to participants at a video conference by maintaining the gaze alignment of a remote participant when displayed on a local monitor. Additionally, balancing the signals assigned to the monitors at a particular site may limit the need to constantly switch the video signal which is displayed in response to a change in active speaker.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
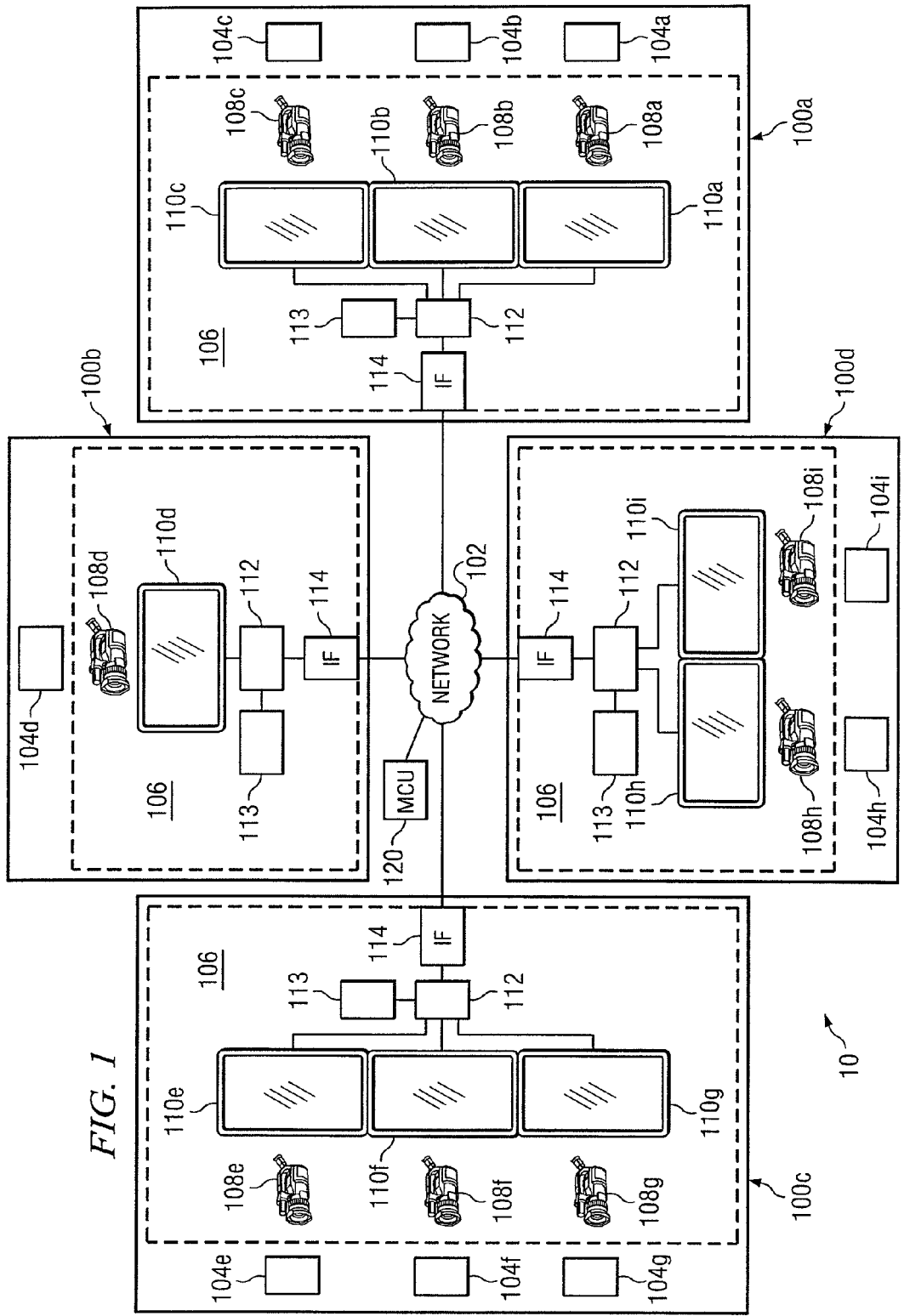
FIG. 1 is a block diagram illustrating a system for conducting a videoconference between sites, in accordance with some embodiments.

FIG. 1 illustrates a communication system 10 for conferencing in accordance with a particular embodiment. The illustrated embodiment includes a network 102 that facilitates a videoconference between remotely located sites 100 using conference equipment 106. Sites 100 include any suitable number of users 104 that participate in the videoconference. Communication system 10 provides users 104 with a realistic videoconferencing experience even though a local site 100 may have more or less conference equipment 106 than a remote site 100.

Network 102 represents communication equipment, including hardware and any appropriate controlling logic, for interconnecting elements coupled to network 102 and facilitating communication between sites 100. Network 102 may include a local area network (LAN), a metropolitan area network (MAN), a wide area network (WAN), any other public or private network, a local, regional, or global communication network, an enterprise intranet, other suitable wireline or wireless communication link, or any combination of the preceding. To facilitate certain communication capabilities, network 102 may include any combination of gateways, routers, hubs, switches, access points, base stations, and any other hardware, software, or a combination of the preceding that may implement any suitable protocol or communication. While the illustrated embodiment indicates that communication system 10 includes a single communication network 102, communication system 10 may include any number or arrangement of communication networks 102.

MCU 120 acts as an intermediary during a multipoint communication conference. In particular, MCU 120 may collect audio and/or video signals transmitted by conference participants through their endpoints and distribute such signals to other participants of the multipoint conference at remote sites 100. Additionally, MCU 120 may assign particular audio and/or video signals to particular monitors 110 at a remote site 100. MCU 120 may include any bridging or switching device used in support of multipoint conferencing, including videoconferencing. In various embodiments, MCU 120 may include hardware, software and/or embedded logic. MCU 120 may be configured to support any number of conference endpoints communicating on any number of conferences, simultaneously. MCU 120 may be in the form of customer provided equipment (CPE, e.g., beyond the network interface) or may be embedded in a network such as network 102.

User 104 represents one or more individuals or groups of individuals who may be present for the videoconference. Users 104 participate in the videoconference using any suitable device and/or component, such as audio Internet Protocol (IP) phones, video phone appliances, personal computer (PC) based video phones, and streaming clients. During the videoconference, users 104 may engage in the session as speakers or participate as non-speakers. Additionally, as illustrated in FIG. 1, a user 104 is positioned such that the user is facing towards a monitor 110. Thus, as used herein, the terms "left" and "right" are from the perspective of a user at a site 100. Therefore, users 104a, 104e, and 104h, are positioned on the left of their respective sites.

Conference equipment 106 facilitates videoconferencing among users 104. Conference equipment 106 may establish the videoconference session using any suitable technology and/or protocol, such as Session Initiation Protocol (SIP) or H.323. Additionally, equipment 106 may support and be interoperable with other video systems supporting other standards, such as H.261, H.263, and/or H.264. Conference equipment 106 may include any suitable elements to establish and facilitate the videoconference. For example, conference equipment 106 may include loudspeakers, user interfaces, controllers, microphones, or a speakerphone. In the illustrated embodiment, conference equipment 106 includes cameras 108, monitors 110, processor 112, memory module 113, and network interface 114.

Cameras 108 may include any suitable hardware and/or software to facilitate capturing an image of user 104 and the surrounding area as well as providing the image to other users 104. The area captured by a particular camera 108 may be referred to as a "segment." Thus, as illustrated in FIG. 1, site 100b has a single segment and site 100c has three segments. In certain embodiments, cameras 108 may capture and transmit the image of user 104 as a video signal (e.g. a high definition video signal). Depending on the embodiment, the video signal transmitted may comprise a separate signal (e.g., each camera 108 transmits its own signal) or a combined signal (e.g., the signal from multiple sources are combined into one video signal).

Monitors 110 may include any suitable hardware and/or software to facilitate receiving a video signal and displaying the image of a user 104 to other users 104. For example, monitors 110 may include a notebook PC, a wall mounted monitor, a floor mounted monitor, or a free standing monitor. Monitors 110 may display the image of user 104 using any suitable technology that provides a realistic image, such as high definition, high-power compression hardware, and efficient encoding/decoding standards. As used herein, a site 100 having a single monitor 110 is a "single," a site having two monitors is a "double," and a site having three monitors is a "triple."

Interface 114 communicates information and signals to and receives information and signals from network 102. Interface 114 represents any port or connection, real or virtual, including any suitable hardware and/or software that allow conference equipment 106 to exchange information and signals with network 102, other conference equipment 106, and/or other elements of communication system 10.

Processor 112 controls the operation and administration of conference equipment 106 by processing information and signals received from cameras 108 and interfaces 114. Processor 112 may include any suitable hardware, software, or both that operate to control and process signals. For example, processor 112 may be a programmable logic device, a microcontroller, a microprocessor, any suitable processing device, or any combination of the preceding. In certain embodiments, processor 112 may assist MCU 120 in the distribution of audio and/or video signals to monitors 110.

Memory 113 may store any data or logic used by processor 112 in providing videoconference functionality. In some embodiments memory 113 may store all, or a portion, of a videoconference. Memory 113 may include any form of volatile or non-volatile memory including, without limitation, magnetic media, optical media, random access memory (RAM), read-only memory (ROM), removable media, or any other suitable local or remote memory component.

Modifications, additions, or omissions may be made to communication system 10. For example, communication system 10 may include any suitable number of sites 100 and may facilitate a videoconference between any suitable number of sites 100. As another example, sites 100 may include any suitable number of cameras 108 and monitors 110 to facilitate a videoconference. As yet another example, a videoconference between sites 100 may be point-to-point conferences or multipoint conferences. For point-to-point conferences, the number of monitors 110 or zones at local site 100 may be less than the number of cameras 108 at remote site 100. For multipoint conferences, the aggregate number of cameras 108 at remote sites 100 may be greater than the number of monitors 110 or zones at local site 100. Accordingly, the operations of communication system 10 may be performed by more, fewer, or other components. In addition, operations of communication system 10 may be performed using any suitable logic.

FIG. 1 illustrates the general interaction of the components of communication system 10 during a videoconference. When users 104 join a videoconference, a video signal is generated for each camera 108 and is assigned to a monitor 110. More specifically, once users 104a-104i have logged in there may be nine different video signals, one each from cameras 108a-108i. These video signals may then be assigned by MCU 120, for example in connection with processor 112, to monitors 110 throughout communication system 10. In general, each video signal may be assigned to only one monitor at a particular site 100, and thus each user may only be displayed on one monitor per site 100. The assignments may persist for the duration of the videoconference. Thus, a remote user may be displayed on the same local monitor for the duration of the videoconference. This may make it easier for local users to identify who and where the remote user is. Alternatively, a user's assignment may be dynamic (i.e. change between monitors) to accommodate for users entering or leaving a conference. Accordingly, the system may ensure that the number of signals assigned to any particular monitor is balanced. This may enable the system to minimize conflicts with respect to displaying an active speaker.

Because multiple video signals from multiple cameras may be assigned to a particular monitor, a monitor may switch between the respective assigned signals based on certain metrics. For example, the monitor may display the video signal from a camera associated with the last user to speak, or which user is currently speaking the loudest. Thus, as various users 104 speak during the videoconference, the video signal displayed on a monitor 110 may change.

Assignments may be made according to a multitude of factors. For example, a particular objective in assigning a video signal to a monitor may be to maintain spatial consistency. As used herein, spatial consistency references positioning a speaker who is situated in a particular segment of a remote site so that the image of the user is displayed on a monitor of a local site which corresponds to the segment. More particularly, in the case of a triple to triple conference, maintaining spatial consistency means that a signal from the left segment (as defined from the perspective of the user(s)) of a remote site will be displayed on the right monitor at a local site (as defined from the perspective of the user(s)). An objective of maintaining spatial consistency may be to ensure gaze alignment. Gaze alignment refers to positioning a remote participant in a way so that if the person looks in a certain direction, it appears that the participant is looking at the local participants and not looking off at nothing.

Maintaining spatial consistency may allow users at respective sites to experience a conference as though a participant at a remote site is positioned as the participant would be if he/she is seated at the opposite side of the table in an actual conference. For instance, assigning the video signal associated with user 108e to monitor 110c may provide users at site 100a with the experience that user 104e is positioned across from them (i.e. to the right of users 104a-104c) in an actual conference. As can be envisioned, if user 104e looks to the right (towards the center of site 100c), monitor 110c will display user 104e as looking towards the center of site 100a. By contrast, if user 104e is displayed on monitor 110a, then it will appear as though user 104g is looking outwards to the users viewing monitor 110a at site 100a. Therefore, maintaining spatial consistency may provide a more natural and realistic videoconferencing experience to a user by ensuring that the movement, gaze, and eye contact of a remote user is accurately reproduced for a local user.

To further illustrate the concept of spatial consistency, the following example is provided wherein sites 100a-100d are engaged in a video conference and cameras 108e-108i are assigned to monitors 110a-110c at site 100a. To maintain spatial consistency cameras 108g and 108i may be assigned to monitor 110a, cameras 108d and 108f may be assigned to monitor 110b, and cameras 108e and 108h may be assigned to monitor 110c. Assigning the video signals in such a manner may enhance the videoconference experience for users at site 100a by providing a videoconference experience which emulates an actual conference.

As may be evident, certain signals assignments may be more flexible than others with respect to spatial consistency. For example, assigning a video signal from a double, such as site 100d, to the center monitor of a triple, such as site 100a, would not hinder gaze alignment to the same extent as would assigning a video signal from the left or right of a triple to the center of another triple. Similarly, assigning a video signal from the right of a triple to the right monitor of a remote triple would hinder gaze alignment more than assigning the signal to the center monitor of the remote triple. Additionally, because a participant at a single, such as user 104d at site 100b, will generally be looking straight forward at monitor 110d, a video signal from a single may generally be displayed on any monitor and still maintain gaze alignment. As will be explained in greater detail below, MCU 120 and/or processor 112 may assign signals according to the relative flexibility of the signal with respect to maintaining spatial consistency.

Doubles (i.e., sites having two segments) may present a unique situation with respect to spatial consistency. In particular, doubles may be more flexible than triples but less flexible than a single in terms of signal assignment. For example, it may be desirable to assign the two segments of a double to adjacent screens at a remote site. Accordingly, remote signals may be displayed locally as though there is continuity between the segments. Additionally, proper gaze alignment may be maintained between the remote segments. Thus, when assigning segments from a remote double to a local triple, the left segment of the double may be designated as a center segment and the right segment may still be designated as a right segment (and thus assigned to the left monitor). Alternatively, the right segment of the double may be designated as a center segment and the left segment may still be designated as a left segment (and thus be assigned to the left monitor). In other embodiments, the left segment and the right segment may maintain their respective designations and be assigned to the right and left monitors, respectively, of a local triple.

In addition to maintaining spatial consistency, signals may also be assigned in a manner which balances the signal queues for each monitor 110 at a site 100. The term signal queue references the number of signals assigned to a particular monitor 110 and not necessarily the order in which a signal is to be displayed on a particular monitor. Because a monitor 110 may only display a single speaker (i.e. a single video signal) at a time, balancing signal queues may help to prevent a situation where two active speakers are assigned to the same monitor. This may also limit the need to constantly switch the video signal which is displayed in response to a change in active speaker.

As an example of a particular balancing policy, assume that two monitors in a triple are each assigned a single signal and the third monitor does not have an assigned signal. If a new user joins the videoconference, a balancing policy may ensure that each monitor at a site is assigned a signal before a signal is assigned to a monitor already having an assigned signal. In certain embodiments, this assignment may be made notwithstanding a spatial consistency policy. Assigning the new user to the free monitor even if it does not maintain spatial consistency may enhance the videoconference experience for local users by allowing them to view all the remote participants rather than a limited number. However, any exceptions to gaze alignment may be corrected at the first opportunity. An example of such an opportunity is when a new participant joins the conference or when an existing participant leaves the conference.

In a particular embodiment, MCU 120 and/or processor 112 may assign signals according to an algorithm which weights the relative importance of maintaining spatial consistency versus balance among signal queues. For example, a situation may arise when a user positioned at the left of a triple (e.g. user 104(e)) seeks to enter a conference where there are multiple signals already assigned to the right monitor (e.g. monitor 110c) at a remote site. In such a circumstance, the system may assign the signal to the right monitor and thereby maintain spatial consistency. Alternatively, the system may assign the signal to a monitor having a shorter signal queue and thereby maintain balance. To facilitate this decision, the various segments at a videoconference site may be assigned a flexibility rating. Flexibility ratings define the potential for a source segment to be positioned at a specific destination. For instance, a flexibility rating may indicate the relative degree to which a segment may be assigned to a remote monitor which is not the optimal monitor for maintaining spatial consistency. In particular, a flexibility rating may be based on the location and alignment of a particular camera 108 relative to other cameras 108. In an embodiment, the flexibility rating represents the number of additional signals which must be assigned to an optimal monitor (in terms of spatial consistency) as compared to another monitor, before the signal may be assigned to the other monitor. Accordingly, a flexibility rating of three may indicate that in order to violate a spatial consistency parameter, the assigned monitor must have at least three less signals assigned to it than the monitor which would maintain spatial consistency. Therefore, a high flexibility rating may indicate that a particular segment is inflexible with respect to another potential position.

In certain embodiments, the flexibility rating for a particular segment may change according to the extent that an assignment may contravene spatial consistency. In other words, a flexibility rating may vary in accordance with how flexible an assignment may be with respect to maintaining spatial consistency. As discussed, assigning a video signal from camera 108e to monitor 110b or monitor 110a would not maintain spatial consistency. However, spatial consistency would be better maintained by assigning the signal from camera 108e to monitor 110b as opposed to monitor 110a. This is because the gaze of user 104e when looking to the right will be less skewed if positioned at monitor 110a. Thus, the flexibility rating for assigning the video signal from camera 108e to monitor 110b may be less than the flexibility rating required to assign the video signal to monitor 110a.

As mentioned, doubles may present unique issues with respect to spatial consistency and signal assignment. The primary concern with respect to assigning signals from a remote double segment is inversion. For example, the flexibility rating for assigning the video signals from cameras 108h and 108i to monitors 110a and 110b, respectively, may be high relative to other flexibility ratings as a result of the severely skewed gaze alignment. Further, as discussed, it may be desirable to assign video signals from a double such that they are displayed on adjacent local monitors. These guidelines may be implemented by applying a policy wherein the flexibility rating for assigning the video signal for a particular segment of a double to a center monitor of a triple is the same as (or possibly lower than) the flexibility rating for assigning the signal for the segment to the monitor which would maintain optimal gaze alignment. To illustrate, the flexibility rating for assigning the signal from camera 108h to monitor 110b may be the same as for assigning the signal to monitor 110c. Additionally, a further policy may provide that the previous policy is only implemented if the other segment is assigned to the monitor which would maintain optimal gaze alignment for its segment. Accordingly, the policy may dictate that the signal from camera 108h may only be assigned to monitor 110b if and only if the signal from camera 108i is assigned to monitor 110a.

It should be noted that assignments may occur whenever there is a positioning event. A positioning event references any time a site joins or exits a conference. Thus, when a particular site joins a videoconference, each signal from the site may be positioned according to spatial consistency parameters, balance, and a respective flexibility rating. When a site leaves the conference, a particular signal queue at a site may be imbalanced. Thus, the system may (re)assign signals to maintain balance and/or spatial consistency.

Figure 2:
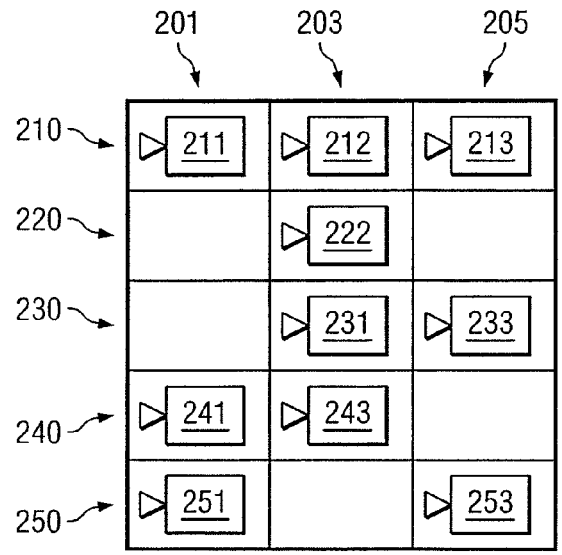
FIG. 2 is a chart illustrating possible assignments of remote video signals to local monitors, in accordance with some embodiments.

Depicted in FIG. 2 is a chart illustrating possible assignments of remote video signals to local monitors in a system which implements balancing and spatial consistency policies in accordance with a particular embodiment. In the example represented in FIG. 2, signals from remote cameras from five different remote sites, remote sites 210, 220, 230, 240, and 250 to three different local monitors 201, 203 and 205. Each video signal is represented by a camera (e.g., video signals 211, 212, 213, 222, 231, 233, 241, 243, 251, and 253). In the example illustrated in FIG. 2, assume that the sites join the video conference in the following order: site 210, 220, 230, 240, and 250. Further assume that a policy is implemented wherein the flexibility rating to separate the segments of a double (i.e., assign to non-adjacent local monitors) is two. Therefore, there must be more than two additional signals assigned to a particular monitor with respect to the other monitors before the video signals from a remote double may be separated at local triple monitors. It should be noted that the assignments illustrated in FIG. 2 may be performed by an MCU such as MCU 120 in FIG. 1.

Remote site 210 has three video signals, right video signal 211, center video signal 212 and left video signal 213. The assignment in this situation may be relatively straight forward because the number of local displays is equal to the number of video signals and site 210 is the first site to join the conference. Accordingly, balancing is not an issue (i.e. the flexibility rating is not met), so the signals may be assigned in a manner which will maintain spatial consistency. More specifically, right video signal 211 may be assigned to the left local display 201, center video signal 212 may be assigned to center display 203, left video signal 213 may be assigned to right monitor 205. Remember, that for purposes of this specification, "right" and "left" are defined from the perspective of a user at a given site. Thus, a left video signal may be generated by the left camera from the perspective of a user at a remote site and displayed on the right monitor from the perspective of a user at the local site.

Remote site 220 is the next site to join the conference and has a single video signal, center video 222. Because the signal assignments are balanced (i.e. each monitor is assigned a single video signal) when remote site 220 joins the conference, center video signal 222 may be assigned to any monitor without violating a balancing policy. While remote site 220 is a single, and thus, in certain embodiments, may have its associated video signal assigned to any monitor (left, right, or center), assigning the signal to a center monitor may be desirable for maintaining gaze alignment. Thus, center video signal 222 may be assigned to center monitor 203.

Remote sites 230 through 250 each have two video signals, right video signals 231, 241 and 251, respectively, and left video signals 233, 243, and 253, respectively. As mentioned, the flexibility rating for assigning the video signals from a double to non-adjacent monitors is two. Thus, as illustrated, right video signal 231 is assigned to center monitor 203 and left video signal 223 is assigned to right monitor 205. Such an assignment would maintain spatial consistency while not violating the balancing policy. This is because when remote site 230 joins the conference it is necessary that at least two monitors be assigned two video signals. Additionally, the flexibility rating for assigning the video signals to non-adjacent monitors is not exceeded as center monitor 203 is assigned three signals and left monitor 201 is assigned a single signal. Thus, the illustrated signal assignment for site 230 may be made without violating the flexibility rating.

Continuing with the example, when remote site 240 joins the conference, right video signal 241 may be assigned to left monitor 201 and left video signal 243 may be assigned to center monitor 203. This assignment does not exceed the flexibility rating as each of monitors 201 and 205 have two assigned video signals and monitor 203 has four assigned video signals. By contrast, assigning right video signal 241 to center monitor 203 and left video signal 243 to right monitor 205 would exceed the flexibility rating as center monitor 203 would have four assigned signals and left monitor 201 would have a single signal assigned thereto. Thus, given the parameters of the example, the illustrated assignment is the only possible assignment scenario that exists without separating the video signals.

Still continuing with the example illustrated in FIG. 2, remote site 250 is the last site to join the conference. As illustrated, right video signal 251 is assigned to left monitor 201 and left video signal 253 is assigned to right monitor 205. The video signals are separated because assigning either right video signal 251 or left video signal 253 to center monitor 203 would exceed the flexibility rating of two. This is because center monitor 203 would have five video signals assigned thereto, whereas one of the two side monitors (201 or 205) would only have two assigned video signals.

As previously mentioned, assignments may occur whenever there is a positioning event such as when a new site joins a conference or a site leaves a conference. To illustrate how a (re)assignment may occur if a site leaves a conference, assume that site 220 exits the conference. In this case, either signal 253 or signal 251 may be assigned to center monitor 203. This is because the flexibility rating for each would dictate that each respective signals should be assigned to adjacent monitors. Because only one of signals 251 or 253 may be assigned to a respective monitor which would maintain spatial consistency, the system may randomly select which monitor is (re)assigned. Alternatively, the system may use any suitable policy in determining which signal should be (re)assigned to its respective preferred monitor.

Figure 3:
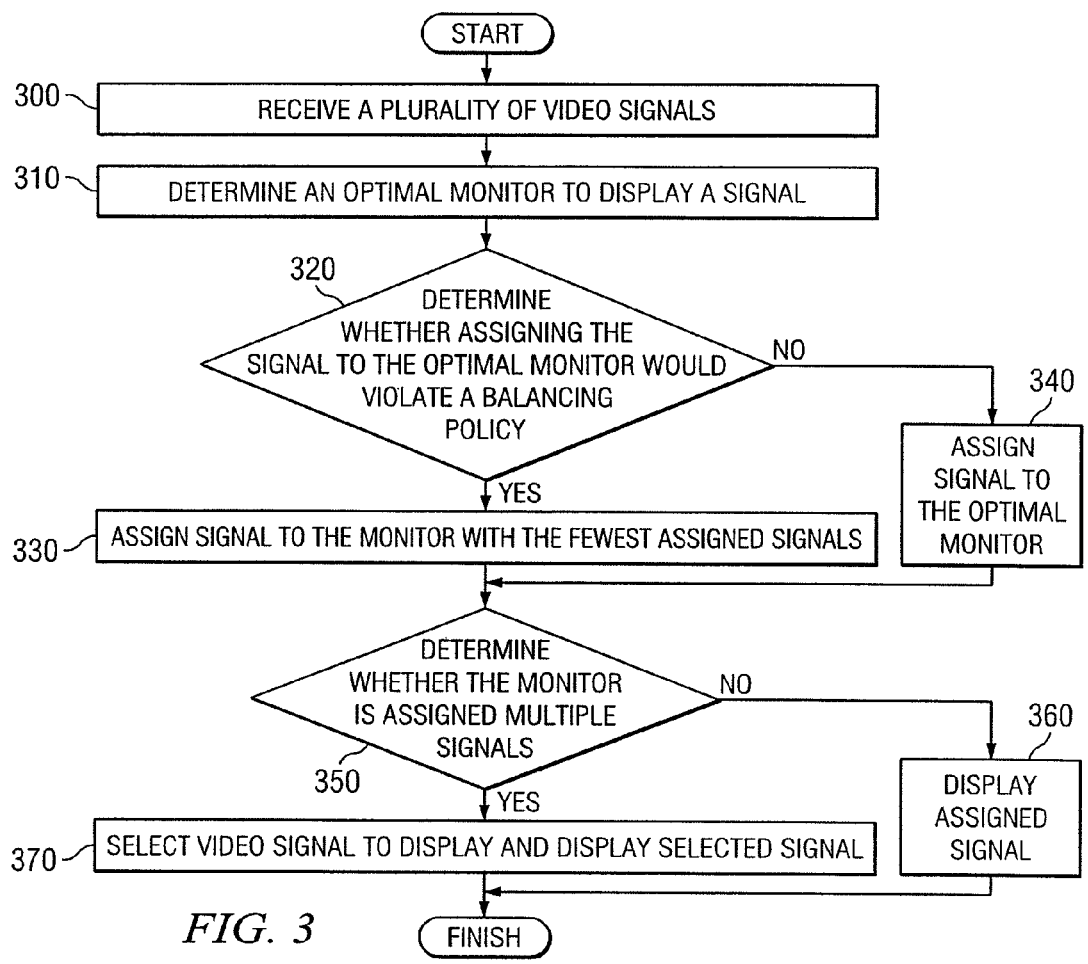
FIG. 3 is a flowchart illustrating a method for assigning video signals, in accordance with some embodiments.

Referring now to FIG. 3, a flow chart illustrating a method for assigning and displaying video signals in accordance with a particular embodiment is provided. The method begins at step 300 where a plurality of video signals are received. The video signals may be for display on a plurality of monitors at a local site and may be generated by a corresponding plurality of remote cameras. The remote cameras may all be located at the same remote site or they may be spread out among multiple remote sites.

At step 310 an optimal monitor for displaying a particular video signal is determined. The optimal monitor may correspond to the monitor which will best maintain spatial consistency. Accordingly, the determination may be based on the location and alignment of the camera which generated the video signal in relation to one or more other cameras.

Next, at step 320, it is determined whether assigning the video signal to its respective optimal monitor will violate a balancing policy. This determination may be made by calculating the difference between the number of signals already assigned to the optimal monitor and the number of signals assigned to each of the other monitors at a particular site. If the difference in assigned signals between the optimal monitor and any of the other monitors exceeds a certain threshold value (i.e., the flexibility rating), then assigning the video signal to the optimal monitor will violate the balancing policy. If this is the case, then the video signal may be assigned to the monitor with the fewest assigned signals at step 330. However, if the difference in assigned signals for each monitor at a site does not exceed the flexibility rating, then the balancing policy is not violated and the video signal may be assigned to the optimal monitor at step 340.

Once a signal is assigned, a determination whether to display the signal may be made. As discussed, a particular monitor may be assigned multiple video signals for display. However, a particular monitor may only display a signal from a single camera at any given time. Accordingly, at step 350 a determination is made whether the assigned monitor has more than one assigned video signal. If the monitor is only assigned a single signal, then it will display that video signal at step 360. However, if it is determined that a particular monitor has more than one video signal assigned thereto, then a particular video signal may be selected for display at step 370. In a particular embodiment the selection of which video signal to display is based on the video signal having the highest audio level. The audio level may indicate that the participant associated with the video signal is the active speaker. Upon selecting the video signal to display, the video signal may be displayed on the monitor.

Modifications, additions, or omissions may be made to the method depicted in FIG. 3. In certain embodiments, the method may include more, fewer, or other steps. Additionally, steps may be performed in any suitable order without departing from the scope of the invention.

While the present invention has been described in detail with reference to particular embodiments, numerous changes, substitutions, variations, alterations and modifications may be ascertained by those skilled in the art, and it is intended that the present invention encompass all such changes, substitutions, variations, alterations and modifications as falling within the spirit and scope of the appended claims.

What is claimed is:

1. A computer-implemented method for assigning video signals, comprising:
- receiving, at an interface, a plurality of video signals from a plurality of cameras located at one or more remote sites, the plurality of video signals for display on a plurality of monitors at a local site;
- determining, at one or more processors, a first position for displaying on one of the plurality of monitors a first video signal relative to one or more other video signals of the plurality of video signals;
- wherein the first video signal is associated with a first camera of the plurality of cameras;
- wherein the one or more other video signals are associated with one or more other cameras of the plurality of cameras;
- wherein the first position is determined based on:
  - the location and alignment of the first camera relative to the one or more other cameras; and
  - a number of the plurality of video signals relative to a number of the plurality of monitors; and
- displaying the first video signal at the first position on one of the plurality of monitors.

2. The method of claim 1, further comprising:
- receiving a new video signal from a new camera located at a remote site;
- in response to receiving the new video signal, determining a new position for displaying on one of the plurality of monitors the first video signal;
- wherein the new position is determined based on:
  - the location and alignment of the first camera relative to the one or more other cameras and the new camera; and
  - a number of the plurality of video signals and the new video signal relative to the number of the plurality of monitors; and
- displaying the first video signal at the new position on one of the plurality of monitors.

3. The method. of claim 1, further comprising:
- terminating receipt of a second video signal of the plurality of video signals from a second camera of the plurality of cameras;
- in response to termination of receipt of the second video signal, determining a new position for displaying on one of the plurality of monitors the first video signal;
- wherein the new position is determined based on:
  - the location and alignment of the first camera relative to the one or more other cameras other than the second camera; and
  - a number of the plurality of video signals other than the second video signal relative to the number of the plurality of monitors; and
- displaying the first video signal at the new position on one of the plurality of monitors.

4. The method of claim 1, further comprising:
- determining that a particular monitor of the plurality of monitors has more than one video signal assigned thereto;
- in response to determining that a particular monitor of the plurality of monitors has more than one video signal assigned thereto, selecting a video signal of the more than one video signal assigned to the monitor; and
- displaying the selected video signal.

5. The method of claim 4, wherein selecting a video signal of the more than one video signal assigned to the monitor comprises selecting the video signal having the highest audio level of the more than one video signal.

6. A system for assigning video signals, comprising:
- an interface operable to receive a plurality of video signals from a plurality of cameras located at one or more remote sites;
- a plurality of monitors at a local site, the plurality of monitors operable to display one or more of the plurality of video signals; and
- one or more processors coupled to the interface and operable to:
  - determine a first position for displaying on one of the plurality of monitors a first video signal relative to one or more other video signals of the plurality of video signals;
  - wherein the first video signal is associated with a first camera of the plurality of cameras;
  - wherein the one or more other video signals are associated with one or more other cameras of the plurality of cameras;
  - wherein the first position is determined based on:
    - the location and alignment of the first camera relative to the one or more other cameras; and
    - a number of the plurality of video signals relative to a number of the plurality of monitors; and
  - display the first video signal at the first position on one of the plurality of monitors.

7. The system of claim 6:
- wherein the interface is operable to receive a new video signal from a new camera located at a remote site; and
- wherein the one or more processors are operable to:
  - in response to receiving the new video signal, determine a new position for displaying on one of the plurality of monitors the first video signal;
  - wherein the new position is determined based on:
    - the location and alignment of the first camera relative to the one or more other cameras and the new camera; and
    - a number of the plurality of video signals and the new video signal relative to the number of the plurality of monitors; and
  - display the first video signal at the new position on one of the plurality of monitors.

8. The system of claim 6:
- wherein the interface is operable to terminate receipt of a second video signal of the plurality of video signals from a second camera of the plurality of cameras;
- wherein the one or more processors are operable to:
  - in response to termination of receipt of the second video signal, determine a new position for displaying on one of the plurality of monitors the first video signal;
  - wherein the new position is determined based on:
    - the location and alignment of the first camera relative to the one or more other cameras other than the second camera; and
    - a number of the plurality of video signals other than the second video signal relative to the number of the plurality of monitors; and
  - display the first video signal at the new position on one of the plurality of monitors.

9. The system of claim 6, wherein the one or more processors are further operable to:
- determine that a particular monitor of the plurality of monitors has more than one video signal assigned thereto;

in response to determining that a particular monitor of the plurality of monitors has more than one video signal assigned thereto, select a video signal of the more than one video signal assigned to the monitor; and display the selected video signal.

10. The system of claim 9, wherein the one or more processors operable to select a video signal of the more than one video signal assigned to the monitor comprises one or more processors operable to select the video signal having the highest audio level of the more than one video signal.

11. A non-transitory computer readable medium encoding logic, the logic comprising code operable to:

receive a plurality of video signals from a plurality of cameras located at one or more remote sites, the plurality of video signals for display on a plurality of monitors at a local site;

determine a first position for displaying on one of the plurality of monitors a first video signal relative to one or more other video signals of the plurality of video signals;

wherein the first video signal is associated with a first camera of the plurality of cameras;

wherein the one or more other video signals are associated with one or more other cameras of the plurality of cameras;

wherein the first position is determined based on:
the location and alignment of the first camera relative to the one or more other cameras; and
a number of the plurality of video signals relative to a number of the plurality of monitors; and display the first video signal at the first position on one of the plurality of monitors.

12. The medium of claim 11, wherein the code is further operable to:

receive a new video signal from a new camera located at a remote site;

in response to receiving the new video signal, determine a new position for displaying on one of the plurality of monitors the first video signal;

wherein the new position is determined based on:
the location and alignment of the first camera relative to the one or more other cameras and the new camera; and
a number of the plurality of video signals and the new video signal relative to the number of the plurality of monitors; and display the first video signal at the new position on one of the plurality of monitors.

13. The medium of claim 11, wherein the code is further operable to;

terminate receipt of a second video signal of the plurality of video signals from a second camera of the plurality of cameras;

in response to termination of receipt of the second video signal, determine a new position for displaying on one of the plurality of monitors the first video signal;

wherein the new position is determined based on:
the location and alignment of the first camera relative to the one or more other cameras other than the second camera; and
a number of the plurality of video signals other than the second video signal relative to the number of the plurality of monitors; and display the first video signal at the new position on one of the plurality of monitors.

14. The medium of claim 11, wherein the code is further operable to:

determine that a particular monitor of the plurality of monitors has more than one video signal assigned thereto;

in response to determining that a particular monitor of the plurality of monitors has more than one video signal assigned thereto, select a video signal of the more than one video signal assigned to the monitor; and display the selected video signal.

15. The medium of claim 14, wherein code operable to select a video signal of the more than one video signal assigned to the monitor comprises code operable to select the video signal having the highest audio level of the more than one video signal.

16. A system for assigning video signals, comprising:

means for receiving, at an interface, a plurality of video signals from a plurality of cameras located at one or more remote sites, the plurality of video signals for display on a plurality of monitors at a local site;

means for determining, at one or more processors, a first position for displaying on one of the plurality of monitors a first video signal relative to one or more other video signals of the plurality of video signals;

wherein the first video signal is associated with a first camera of the plurality of cameras;

wherein the one or more other video signals are associated with one or more other cameras of the plurality of cameras;

wherein the first position is determined based on:
the location and alignment of the first camera relative to the one or more other cameras; and
a number of the plurality of video signals relative to a number of the plurality of monitors; and means for displaying the first video signal at the first position on one of the plurality of monitors.

* * * * *